United States Patent
Chopra et al.

(10) Patent No.: US 11,438,295 B1
(45) Date of Patent: Sep. 6, 2022

(54) EFFICIENT BACKUP AND RECOVERY OF ELECTRONIC MAIL OBJECTS

(71) Applicant: EMC IP Holding Company LLC, Hopkinton, MA (US)

(72) Inventors: Shelesh Chopra, Bangalore (IN); Sunil Yadav, Bangalore (IN); Amarendra Behera, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/500,860

(22) Filed: Oct. 13, 2021

(51) Int. Cl.
*G06F 15/16* (2006.01)
*H04L 51/42* (2022.01)
*H04L 51/08* (2022.01)

(52) U.S. Cl.
CPC .............. *H04L 51/22* (2013.01); *H04L 51/08* (2013.01)

(58) Field of Classification Search
CPC ................................. H04L 51/22; H04L 51/08
USPC ......................................................... 709/206
See application file for complete search history.

(56) References Cited

U.S. PATENT DOCUMENTS

| | | | |
|---|---|---|---|
| 6,886,024 B1 * | 4/2005 | Fujita | G06F 9/4862 709/201 |
| 8,375,008 B1 | 2/2013 | Gomes | |
| 8,751,449 B2 * | 6/2014 | Carmichael | G06F 16/134 707/626 |
| 8,751,456 B2 * | 6/2014 | Carmichael | G06F 16/178 707/664 |
| 8,775,486 B2 * | 7/2014 | Carmichael | G06F 16/178 707/816 |
| 8,825,769 B2 * | 9/2014 | Zheleva | H04L 63/1433 726/1 |
| 8,959,060 B2 * | 2/2015 | Carmichael | G06F 16/13 707/741 |
| 9,355,245 B2 * | 5/2016 | Zheleva | G06N 7/005 |
| 9,460,105 B2 * | 10/2016 | Carmichael | H04L 43/0876 |
| 9,485,269 B2 * | 11/2016 | Zheleva | G06F 21/55 |
| 9,647,975 B1 * | 5/2017 | Dedenok | H04L 51/12 |
| 10,708,297 B2 * | 7/2020 | Woods | H04L 63/145 |
| 11,095,586 B2 * | 8/2021 | Giura | H04L 51/12 |
| 2004/0221295 A1 | 11/2004 | Kawai et al. | |
| 2005/0060643 A1 * | 3/2005 | Glass | G06F 40/169 715/205 |
| 2005/0114450 A1 | 5/2005 | Devos | |
| 2007/0113035 A1 | 5/2007 | Devos | |
| 2011/0016091 A1 | 1/2011 | Prahlad et al. | |

(Continued)

OTHER PUBLICATIONS

Kim et al, HEDS: Hybrid Deduplication Approach for Email Servers, 2012, pp. 97-102.

(Continued)

*Primary Examiner* — Alicia Baturay
(74) *Attorney, Agent, or Firm* — Chamberlain, Hrdlicka, White, Williams & Aughtry

(57) ABSTRACT

A method and system for the efficient backup and recovery of electronic mail objects. Particularly, the disclosed method and system propose the elimination of redundant electronic mail object content while pursuing backup operations thereof, thus promoting faster and more efficient successive backups. Furthermore, the disclosed method and system propose a framework through which the restoration of electronic mail objects may be decoupled from engagement with any electronic mail client.

20 Claims, 14 Drawing Sheets

(56) References Cited

U.S. PATENT DOCUMENTS

2015/0212889 A1    7/2015   Amarendran et al.
2017/0329677 A1   11/2017   Crofton et al.
2020/0034248 A1    1/2020   Nara et al.
2020/0159413 A1    5/2020   Seal et al.
2020/0379848 A1   12/2020   Ekram et al.

OTHER PUBLICATIONS

Kim et al, SAFE: Structure-Aware File and Email Deduplication for Cloud-based Storage Systems, 2013, pp. 103-137.

* cited by examiner

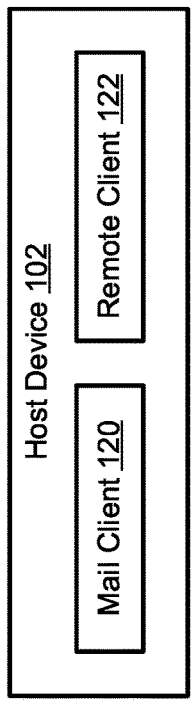
FIG. 1B
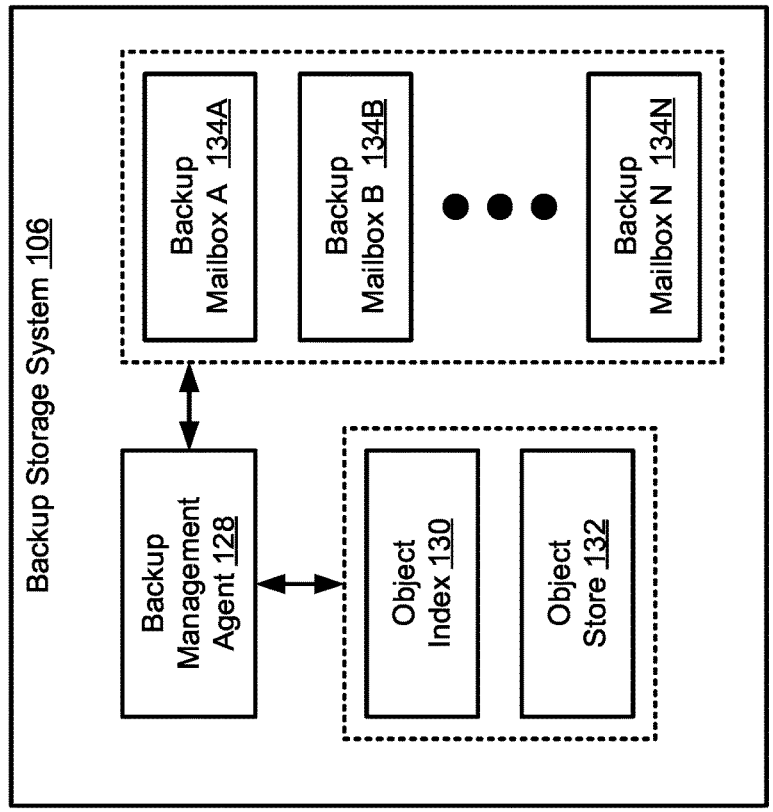
FIG. 1C
FIG. 1D

EFFICIENT BACKUP AND RECOVERY OF ELECTRONIC MAIL OBJECTS

BACKGROUND

Often, a same e-mail, and/or even a same attachment, may be circulated amongst the respective electronic mailboxes of multiple users. Conventional backup procedures, for protecting the content of these electronic mailboxes, tend to store various copies of the same e-mail, and/or of the same attachment, thus promoting the inefficient utilization of backup storage space.

SUMMARY

In general, in one aspect, the invention relates to a method for protecting electronic mail objects. The method includes receiving a backup request comprising an electronic mail message; decomposing the electronic mail message into a message header and a message body, wherein the message body comprises a message content; generating a message content fingerprint based on the message content; making a determination that an object index excludes an existing object index entry comprising the message content fingerprint; based on the determination: storing, in an object store, a new object comprising a new object identifier (ID) and the message content; storing, in the object index, a new object index entry comprising the new object ID, the message header, and the message content fingerprint; and storing, to fulfill the backup request, the new object ID in a backup mailbox.

In general, in one aspect, the invention relates to a non-transitory computer readable medium (CRM). The non-transitory CRM includes computer readable program code, which when executed by a computer processor, enables the computer processor to perform a method for protecting electronic mail objects. The method includes receiving a backup request comprising an electronic mail message; decomposing the electronic mail message into a message header and a message body, wherein the message body comprises a message content; generating a message content fingerprint based on the message content; making a determination that an object index excludes an existing object index entry comprising the message content fingerprint; based on the determination: storing, in an object store, a new object comprising a new object identifier (ID) and the message content; storing, in the object index, a new object index entry comprising the new object ID, the message header, and the message content fingerprint; and storing, to fulfill the backup request, the new object ID in a backup mailbox.

In general, in one aspect, the invention relates to a system. The system includes computer storage implementing an object index, and object store, and a plurality of backup mailboxes; a computer processor operatively connected to the computer storage; and a backup management agent executing on the computer processor, and configured to perform a method for protecting electronic mail objects. The method includes receiving a backup request comprising an electronic mail message; decomposing the electronic mail message into a message header and a message body, wherein the message body comprises a message content; generating a message content fingerprint based on the message content; making a determination that the object index excludes an existing object index entry comprising the message content fingerprint; based on the determination: storing, in the object store, a new object comprising a new object identifier (ID) and the message content; storing, in the object index, a new object index entry comprising the new object ID, the message header, and the message content fingerprint; and storing, to fulfill the backup request, the new object ID in a backup mailbox of the plurality of backup mailboxes.

Other aspects of the invention will be apparent from the following description and the appended claims.

BRIEF DESCRIPTION OF DRAWINGS

FIG. 1B shows a host device in accordance with one or more embodiments of the invention.

FIG. 1C shows a mail server in accordance with one or more embodiments of the invention.

FIG. 1D shows a backup storage system in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to the efficient backup and recovery of electronic mail objects. Particularly, the invention proposes the elimination of redundant electronic mail object content while pursuing backup operations thereof, thus promoting faster and more efficient successive backups. Furthermore, the invention proposes a framework through which the restoration of electronic mail objects may be decoupled from engagement with any electronic mail client.

Figure 1A:
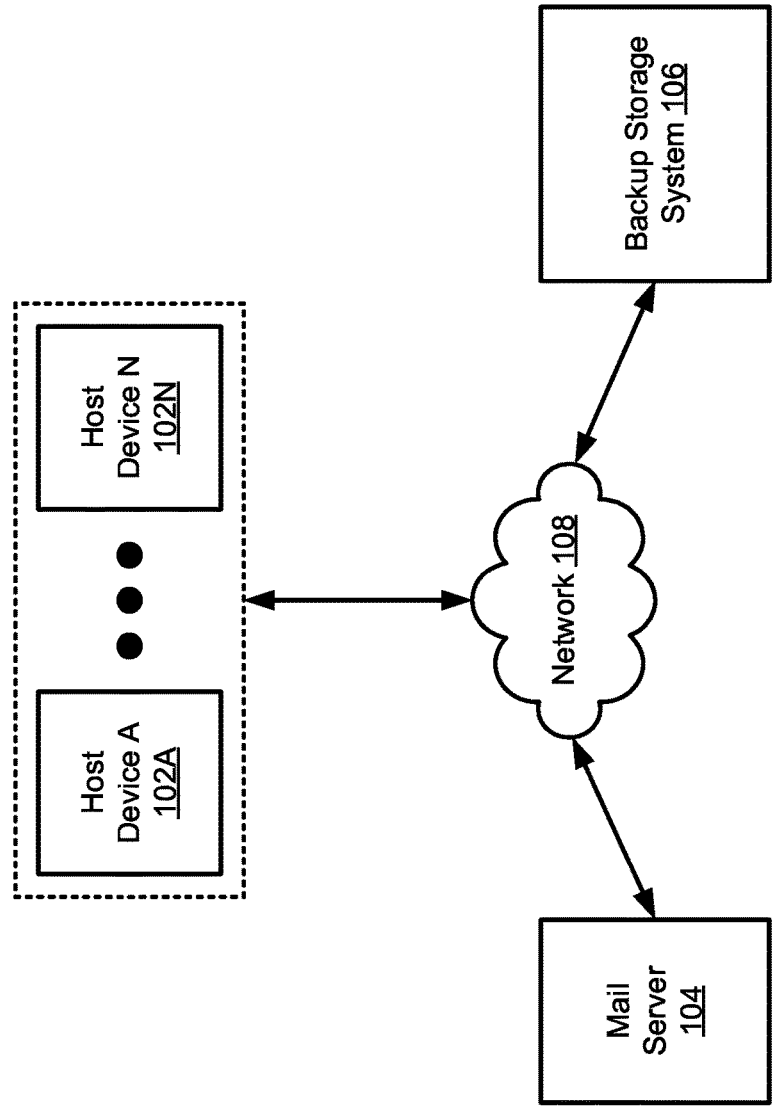
FIG. 1A shows a system in accordance with one or more embodiments of the invention.

FIG. 1A shows a system in accordance with one or more embodiments of the invention. The system (100) may include one or more host devices (102A-102N), a mail server (104), and a backup storage system (106). Each of these system (100) components is described below.

In one embodiment of the invention, a host device (102A-102N) may represent any physical appliance or computing system designed and configured to receive, generate, process, store, and/or transmit data, as well as to provide an environment in which one or more computer programs may execute thereon. The computer programs (not shown) may, for example, implement large-scale and complex data processing; or implement one or more services offered locally or over a network. Further, in providing an execution environment for any computer programs installed thereon, a host device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a host device (102A-102N) may perform other functionalities without departing from the scope of the invention. Examples of a host device (102A-102N) may include, but are not limited to, a desktop computer, a laptop computer, a network server, or any other computing system similar to the exemplary computing system shown in FIG. 5. Moreover, a host device (102A-102N) is described in further detail in FIG. 1B, below.

In one embodiment of the invention, the mail server (104) may represent any appliance or computing system designed and configured to perform mail transfer agent functions. These functions may include, but are not limited to, the distribution of incoming electronic mail (i.e., e-mail) messages to local users (e.g., operating the host device(s) (102A-102N)); and the forwarding of outgoing messages to other remote mail server(s) (not shown) and/or end point(s). To that extent, the mail server (104) may use one or more existing electronic mail protocols (e.g., Post Office Protocol 3 (POP3), Internet Message Access Protocol (IMAP), Simple Mail Transfer Protocol (SMTP), etc.). Further, the mail server (104) may be implemented using one or more network servers—each of which may encompass a physical or virtual network server that may reside in an on-premises data center, a cloud computing environment, or a hybrid infrastructure thereof. Additionally, or alternatively, the mail server (104) may be implemented using one or more computing systems similar to the exemplary computing system shown in FIG. 5. Moreover, the mail server (104) is described in further detail in FIG. 1C, below.

In one embodiment of the invention, the backup storage system (106) may represent any data backup, archiving, and/or disaster recovery storage system. The backup storage system (106) may be implemented using one or more network servers (not shown). Each network server may encompass a physical or a virtual network server, which may reside in an on-premises data center, a cloud computing environment, or a hybrid infrastructure thereof. Additionally, or alternatively, the backup storage system (106) may be implemented using one or more computing systems similar to the exemplary computing system shown in FIG. 5. Furthermore, the backup storage system (106) is described in further detail in FIG. 1D, below.

In one embodiment of the invention, the above-mentioned system (100) components may communicate with one another through a network (108) (e.g., a local area network (LAN), a wide area network (WAN) such as the Internet, a mobile network, any other network type, or a combination thereof). The network (108) may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1A shows a configuration of components, other system (100) configurations may be used without departing from the scope of the invention.

FIG. 1B shows a host device in accordance with one or more embodiments of the invention. The host device (102) may include a mail client (120) and a remote client (122). Each of these host device (102) subcomponents is described below.

In one embodiment of the invention, the mail client (120) may refer to a computer program that may execute on the underlying hardware of the host device (102). Further, the mail client (120) may facilitate user access to electronic mail messages stored on the mail server (104). To that extent, the mail client (120) may include functionality to connect to the mail server (104) to download or synchronize electronic mail messages pertinent to a user, as well as to send out outgoing electronic mail messages drafted on the host device (102). In another embodiment of the invention, the mail client (120) may refer to a web-based electronic mail service, which may facilitate user access to electronic mail messages through a web browser (not shown) installed on the host device (102).

In one embodiment of the invention, the remote client (122) may refer to a computer program that may execute on the underlying hardware of the host device (102). Further, the remote client (122) may enable authorized external entities (e.g., the backup management agent on the backup storage system (described below) (see e.g., FIG. 1D)) to use and control the host device (102) via remote connections. That is, through an established remote connection, the remote client (122) may permit any authorized external entity to, for example, ascertain the hardware and/or software configuration of the host device (102), use any of the computer programs installed on the host device (102), and access data and/or other resources available on the host device (102). One of ordinary skill will appreciate that through a remote connection, an authorized external entity may perform other functions while controlling the host device (102) without departing from the scope of the invention.

While FIG. 1B shows a configuration of subcomponents, other host device (102) configurations may be used without departing from the scope of the invention. For example, one of ordinary skill will appreciate that the host device (102) may include additional computer programs (not shown) installed thereon, which may be used to generate, modify, and/or remove various forms of content.

FIG. 1C shows a mail server in accordance with one or more embodiments of the invention. The mail server (104) may include a data protection agent (124) and one or more mailboxes (126A-126N). Each of these mail server (104) subcomponents is described below.

In one embodiment of the invention, the data protection agent (124) may refer to a computer program that may execute on the underlying hardware of the mail server (104). Further, the data protection agent (124) may facilitate backup and recovery operations targeting the mailbox(es) (126A-126N) (or any granularity of content therein). To that extent, the data protection agent (124) may protect the mailbox(es) (126A-126N) (or any granularity of content therein) against data loss through the backup of targeted electronic mail objects (see e.g., FIGS. 3A-3C); and may restore the mailbox(es) (126A-126N) (or any granularity of content therein), following a data loss event, through the restoration of targeted electronic mail objects. One of ordinary skill, moreover, will appreciate that the data protection agent (124) may perform additional functionalities without departing from the scope of the invention.

In one embodiment of the invention, each mailbox (126A-126N) may refer to a storage location or depository, amongst the persistent storage available on the mail server (104), where electronic mail messages (and other electronic mail related objects such as attachments), pertinent to a given user, may be retained. Further, each mailbox (126A-126N) may be assigned an electronic mail address (also referred to as the mailbox identifier (ID)), which may encompass a character string that uniquely identifies the given user with whom the mailbox (126A-126N) may be associated. Electronic mail messages (also referred herein as messages) are described in further detail in FIG. 2A, below.

While FIG. 1C shows a configuration of subcomponents, other mail server (104) configurations may be used without departing from the scope of the invention.

FIG. 1D shows a backup storage system in accordance with one or more embodiments of the invention. The backup storage system (106) may include a backup management agent (128), an object index (130), an object store (132), and one or more backup mailboxes (134A-134N). Each of these backup storage system (106) subcomponents is described below.

In one embodiment of the invention, the backup management agent (128) may refer to a computer program that may execute on the underlying hardware of the backup storage system (106). Further, the backup management agent (128) may oversee data protection responsibilities and/or operations on the backup storage system (106). To that extent, the backup management agent (128) may include functionality to: receive and fulfill backup requests seeking the protection of electronic mail objects from data loss events by performing the method outlined in FIGS. 3A-3C, below; and receive and fulfill restore requests seeking the restoration of electronic mail objects following a data loss event by performing the method outlined in FIGS. 4A-4C, below. One of ordinary skill, moreover, will appreciate that the backup management agent (128) may perform other functionalities without departing from the scope of the invention.

In one embodiment of the invention, the object index (130) may refer to physical storage (or logical storage occupying at least a portion of the physical storage) on the backup storage system (106), where supplemental information, or metadata, descriptive of objects retained in the object store (132) (described below), may be consolidated and indexed. Further, the object index (130) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Moreover, the aforementioned object metadata, retained in the object index (130), may be organized into object index entries, which is described in further detail below with respect to FIG. 2C.

In one embodiment of the invention, the object store (132) may refer to physical storage (or logical storage occupying at least a portion of the physical storage) on the backup storage system (106), where objects (described below) (see e.g., FIG. 2B) may be consolidated and indexed. Further, the object store (132) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, each backup mailbox (134A-134N) may refer to a storage location or depository, amongst the persistent storage available on the backup storage system (106), where backup copies of electronic mail messages (and other electronic mail related objects such as attachments), pertinent to a given user, may be retained. Each backup mailbox (134A-134N), accordingly, may correspond to a mailbox (see e.g., FIG. 1C), associated with the given user, that may be maintained on the mail server. Furthermore, similar to their respective mailbox counterpart, each backup mailbox (134A-134N) may be assigned an electronic mail address (or mailbox ID) entailing a character string that uniquely identifies the given user with whom the backup mailbox (134A-134N) may be associated. A non-limiting configuration of a backup mailbox (134A-134N) is described in further detail below with respect to FIG. 2E.

While FIG. 1D shows a configuration of subcomponents, other backup storage system (106) configurations may be used without departing from the scope of the invention. For example, in one embodiment of the invention, the backup storage system (106) may further host an extension-application table (not shown) thereon. The extension-application table, in such an embodiment, may refer to a data structure, which may be maintained in non-volatile memory accessible to the backup management agent (128). Further, the extension-application table may be used to store mappings relating attachment extensions to software applications (or computer programs) configured to properly access attachments with the attachment extensions. The extension-application table is described in further detail below with respect to FIG. 2D.

Figure 2A:
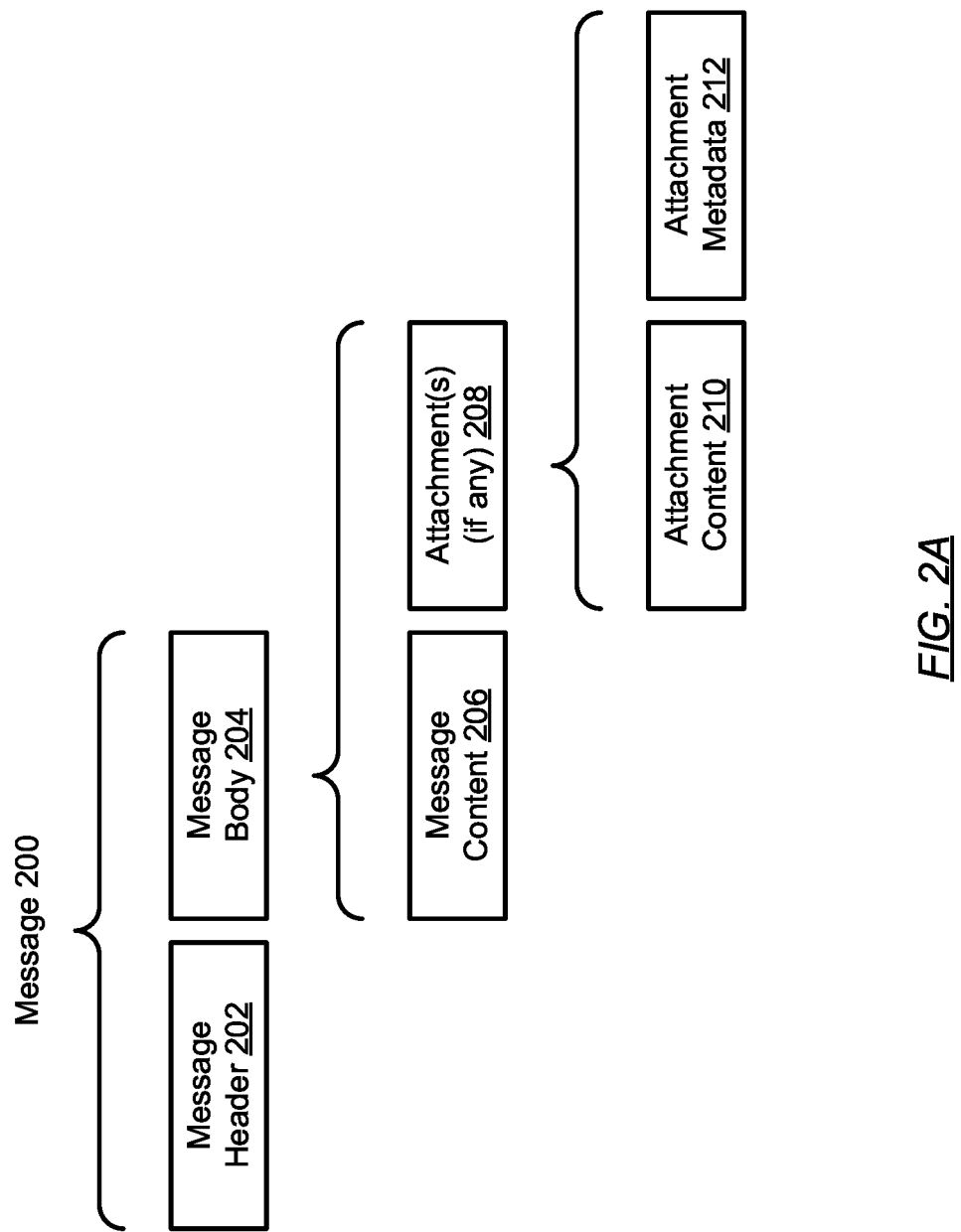
FIG. 2A shows a message in accordance with one or more embodiments of the invention.

FIG. 2A shows a message in accordance with one or more embodiments of the invention. A message (200) (also referred to as an electronic mail message) may refer to a logical container that may include textual, as well as non-textual, information representative of correspondence and content communicated between users. A message (200) may include, and may thus be decomposed into, a message header (202) and a message body (204). Each of these message (200) subcomponents is described below.

In one embodiment of the invention, the message header (202) may refer to a collection of supplemental information, or metadata, descriptive of the message (200). Examples of the metadata forming the message header (202) may include, but are not limited to: a name and/or electronic mail address associated with a sender of the message (200); a name and/or electronic mail address associated with a recipient of the message (200); a subject or topic associated with the message (200); a sent timestamp encoding a date and/or time that a sender sent the message (200); a message identifier (ID) uniquely identifying the message (200); and a received list representative of a route (i.e., series of network servers in reverse chronological order) taken by the message (200) to reach a destination mailbox.

In one embodiment of the invention, the message body (204) may refer to the arbitrary data of the message (200). The message body (204), accordingly, may include, and may thus be decomposed into, message content (206) and zero or more attachments (208). Each of these message body (204) subcomponents is described below.

In one embodiment of the invention, the message content (206) may refer to the information communicated between or amongst users. Often, said information representative of the message content (206) may entail text and/or images, which may or may not include a closing signature.

In one embodiment of the invention, each attachment (208) (if any) may refer to a computer file that may be enclosed in and forwarded with the message (200). Further, each attachment (208) (if any) may include, and may thus be decomposed into, attachment content (210) and attachment metadata (212).

In one embodiment of the invention, the attachment content (210) may refer to the arbitrary data of an attachment (208). Specifically, the attachment content (210) may constitute binary data arranged in one of various existing computer file formats to produce, for example, a text document, an image, a video, an audio clip, or a compressed/archival object. One of ordinary skill will appreciate that the attachment content (210) may convey binary data in other computer file formats without departing from the scope of the invention.

In one embodiment of the invention, the attachment metadata (212) may refer to a collection of supplemental information descriptive of an attachment (208). Examples of the supplemental information forming the attachment metadata (212) may include, but are not limited to: an attachment name (e.g., "statement.pdf") reflective of an attachment title (e.g. "statement") and an attachment extension (e.g., ".pdf") associated with the attachment (208); an attachment author reflecting a name of a user that created the attachment (208) or a name of a computing system on which the attachment (208) may have been created; a modified timestamp encoding a date and/or time that the attachment (208) had been modified last; an attachment size (e.g., measured in bytes) reflective of the storage space that may be consumed by the attachment (208); and an attachment version enumerating a given state of the attachment (208) at a given point-in-time along its changes history.

While FIG. 2A shows a configuration of subcomponents, other message (200) configurations may be used without departing from the scope of the invention.

Figure 2B:
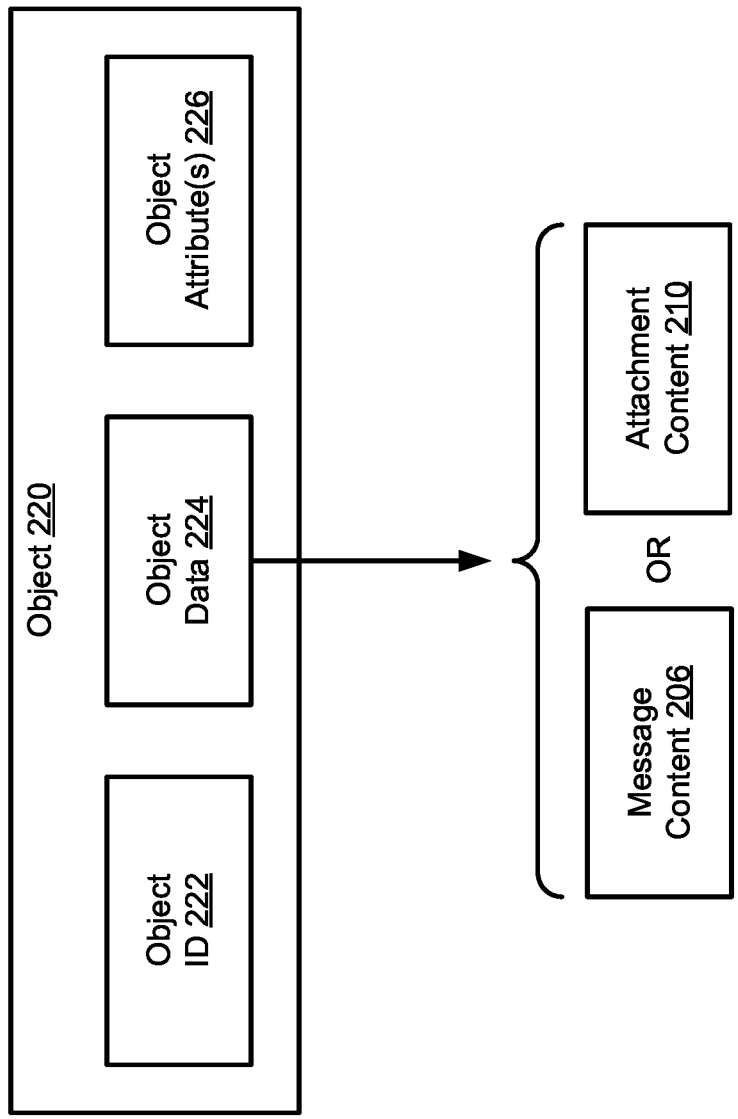
FIG. 2B shows an object in accordance with one or more embodiments of the invention.

FIG. 2B shows an object in accordance with one or more embodiments of the invention. An object (220) may refer to a uniquely identifiable and unstructured unit of data. To that extent, an object (220) may include an object identifier (ID) (222), object data (224), and zero or more object attributes (226). Each of these object (220) subcomponents is described below.

In one embodiment of the invention, the object ID (222) may refer to an arbitrary-length character string (e.g., including lower-case and/or upper-case letters, numbers, symbols, or any combination thereof) that may uniquely identify the object (220).

In one embodiment of the invention, the object data (224) may refer to content sought to be protected against data loss events. Said content may either constitute message content (206) or attachment content (210). Message content (206) may refer to the information communicated between or amongst users through exchanged electronic mail messages, whereas attachment content (210) may refer to the arbitrary data of an electronic mail attachment.

In one embodiment of the invention, an object attribute (226) (if any) may refer to supplemental information, or metadata, descriptive of the object data (224) and/or the object (220). When present, an object attribute (226) may enable collections of objects (not shown), individually addressable by their object ID (222), to be searched, filtered, and/or read in subsets without the need to know the specific object IDs. Examples of an object attribute (226) may include, but are not limited to, an object size of the object (220), access permissions for accessing the object (220), a storage tier of the object store whereon the object (220) may be stored, and a stored timestamp indicating a date and/or time the object (220) had been stored in the object store.

While FIG. 2B shows a configuration of subcomponents, other object (220) configurations may be used without departing from the scope of the invention.

Figure 2C:
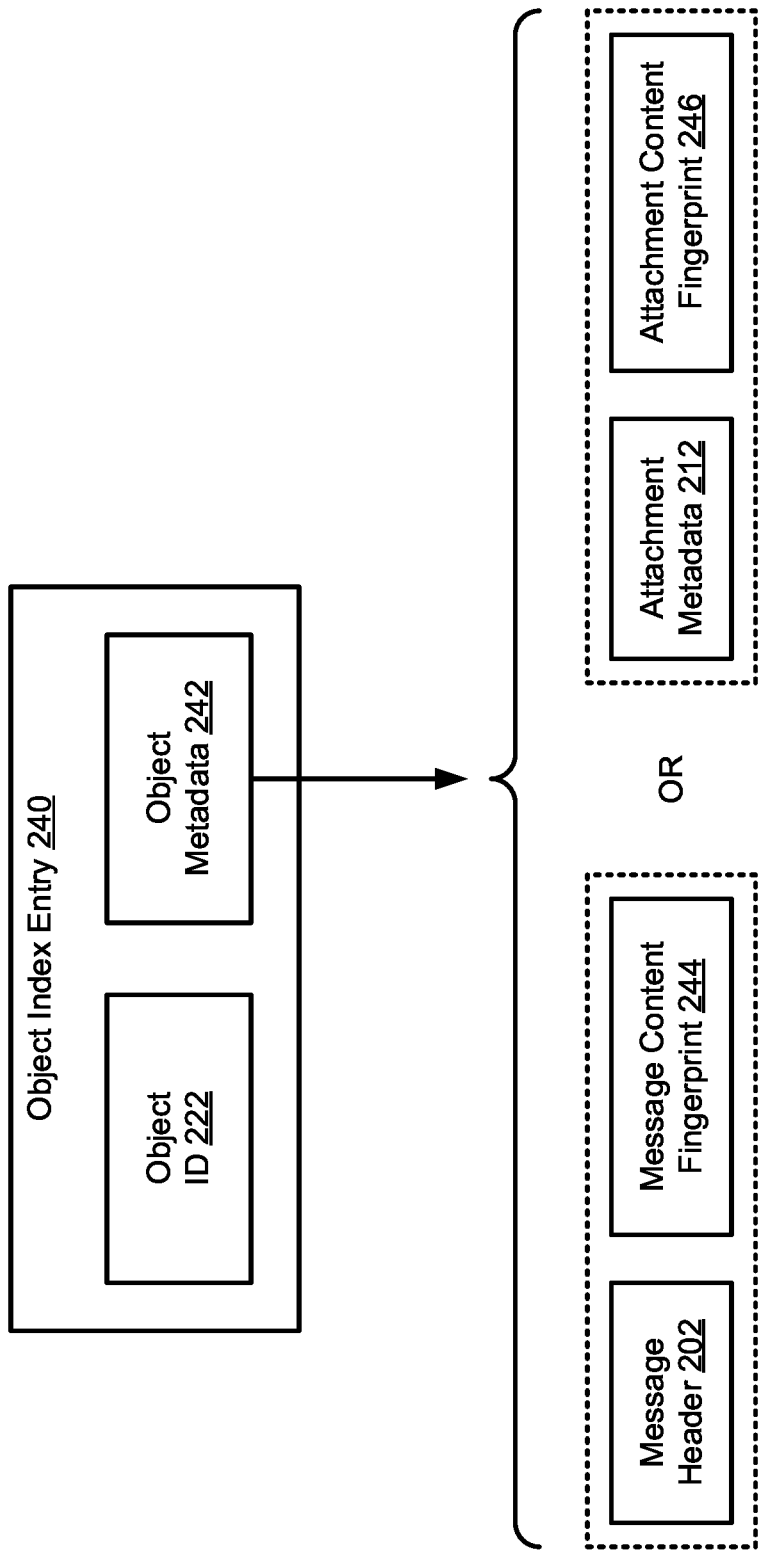
FIG. 2C shows an object index entry in accordance with one or more embodiments of the invention.

FIG. 2C shows an object index entry in accordance with one or more embodiments of the invention. An object index entry (240) may refer to a record that may be maintained in an object index. Further, an object index entry (240) may exist for each object consolidated in an object store and, accordingly, may specify supplemental information particular to a given object. To that extent, an object index entry (240) may include an object identifier (ID) (222) (described above) (see e.g., FIG. 2B) and object metadata (242). The latter is described below.

In one embodiment of the invention, should the object data (224) of an object (220) (see e.g., FIG. 2B) reflect the message content (206) of a message (200) (see e.g., FIG. 2A), then the object metadata (242) relevant to the object (220) may include a message header (202) of the message (200) and a message content fingerprint (244). The former is described above (see e.g., FIG. 2A), whereas the latter may refer to a digital signature that may uniquely identify the message content (206). Further, the message content fingerprint (244) may be generated by submitting the message content (206) through a hash function (not shown), which may employ any combination of existing and/or future developed cryptographic algorithms. As such, the message content fingerprint (244) may represent a hash value, a hash code, or a digest outputted by the hash function given the message content (206) as input.

In another embodiment of the invention, should the object data (224) of an object (220) (see e.g., FIG. 2B) reflect the attachment content (210) of an attachment (208) (see e.g., FIG. 2A), then the object metadata (242) relevant to the object (220) may include the attachment metadata (212) descriptive of the attachment (208) and an attachment content fingerprint (246). The former is described above (see e.g., FIG. 2A), whereas the latter may refer to a digital signature that may uniquely identify the attachment content (210). Further, the attachment content fingerprint (246) may be generated by submitting the attachment content (210) through a hash function (not shown), which may employ any combination of existing and/or future developed cryptographic algorithms. As such, the attachment content fingerprint (246) may represent a hash value, a hash code, or a digest outputted by the hash function given the attachment content (210) as input.

While FIG. 2C shows a configuration of subcomponents, other object index entry (240) configurations may be used without departing from the scope of the invention.

Figure 2D:
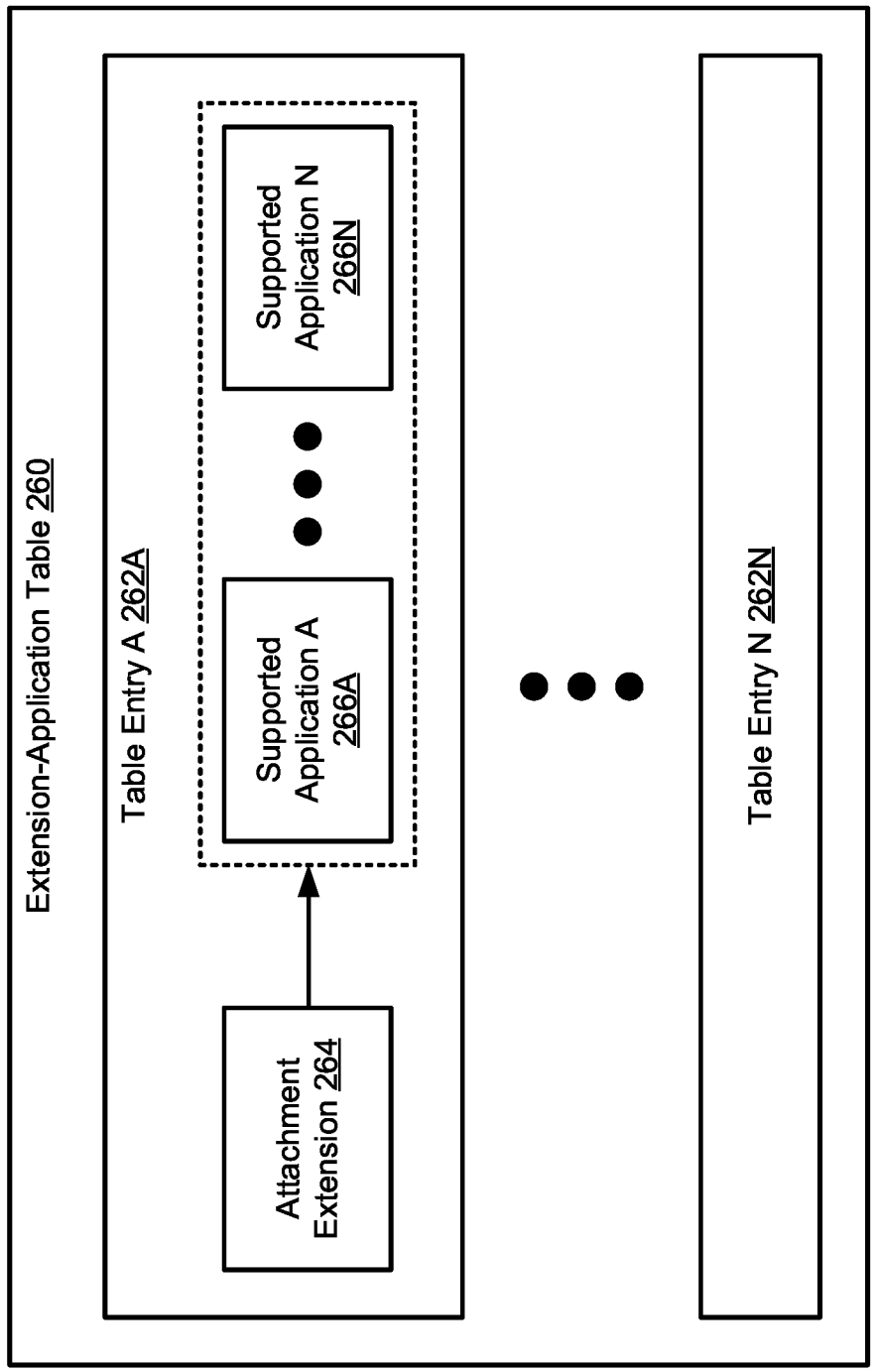
FIG. 2D shows an extension-application table in accordance with one or more embodiments of the invention.

FIG. 2D shows an extension-application table in accordance with one or more embodiments of the invention. The extension-application table (260) may represent a data structure that maintains one or more table entries (262A-262N). Each table entry (262A-262N) may store a mapping relating an attachment extension (264) to at least one supported application (266A-266N). Each of these table entry (262A-262N) subcomponents is described below.

In one embodiment of the invention, an attachment extension (264) may refer to an identifier that indicates a content type or format of a corresponding attachment (208). Further, an attachment extension (264) may combine with an attachment title to form an attachment name for an attachment (208). Examples of an attachment extension (264) may include, but are not limited to, a "avi" extension reflective of an audio video interleave file format; a "bin" extension reflective of a binary file format; a "csv" extension reflective of a comma separated values file format; a "doc" extension reflective of a text document file format; a "html" extension reflective of a hypertext markup language file format; a "jpeg" extension reflective of a joint photographic experts group file format; a "mp3" extension reflective of a MPEG audio stream layer 3 file format; a "rar" extension reflective of an archive file format; a "sql" extension for a structured query language file format; and a "txt" extension reflective of a plain text file format.

In one embodiment of the invention, a supported application (266A-266N) may refer to an existing software application or computer program known to be able to open or properly read and/or modify any attachment (e.g., file) associated with the attachment extension (264). By way of an example, the supported application(s) (266A-266N) that may open/read/modify any attachment exhibiting the above-mentioned "avi" attachment extension (264) may include any existing video and/or multi-media software application. By way of another example, the supported application(s) (266A-266N) that may open/read/modify any attachment exhibiting the above-mentioned "txt" attachment extension (264) may include any existing word processing or text editing software application.

Figure 2E:
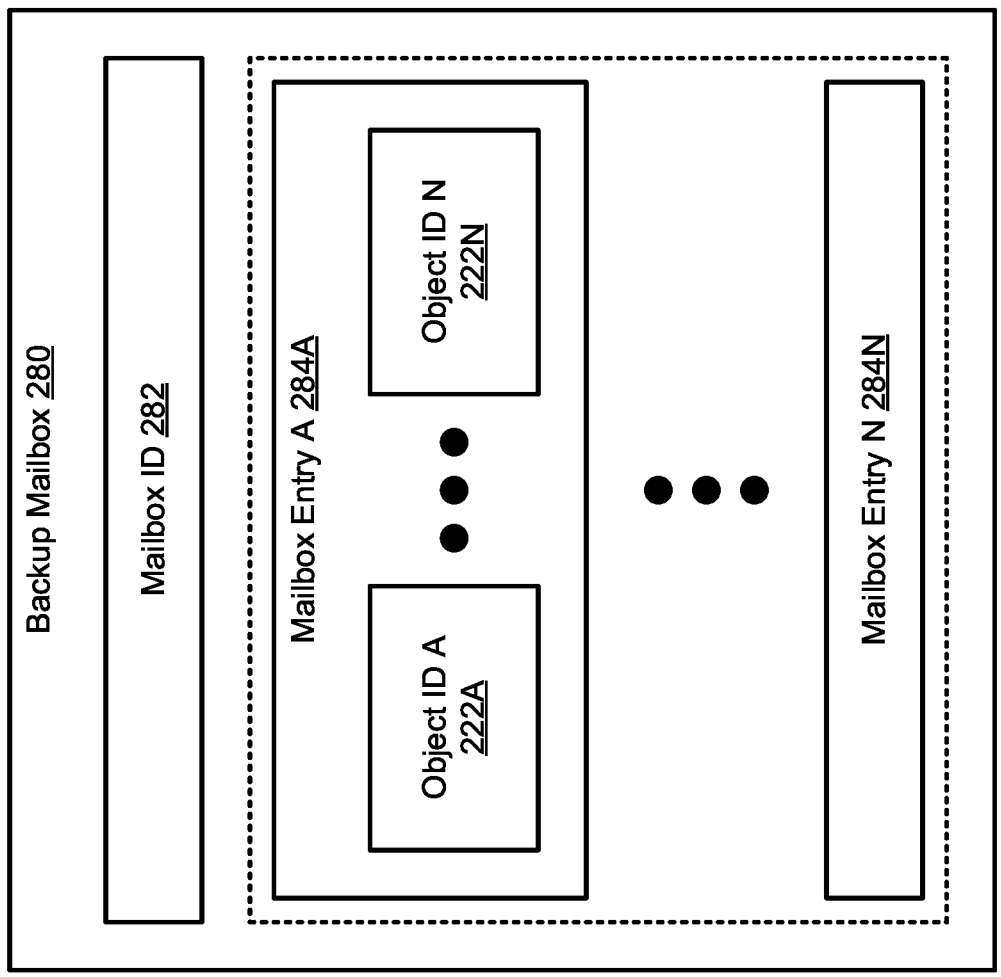
FIG. 2E shows a backup mailbox in accordance with one or more embodiments of the invention.

FIG. 2E shows a backup mailbox in accordance with one or more embodiments of the invention. A backup mailbox (280) may refer to a storage location or depository, on the backup storage system (see e.g., FIG. 1D), that maintains and indexes backup copies of electronic mail messages (as well as other electronic mail related objects) pertinent to a given user. To that extent, a backup mailbox (280) may include a mailbox identifier (ID) (282) and one or more mailbox entries (284A-284N). Each of these backup mailbox (280) subcomponents is described below.

In one embodiment of the invention, the mailbox ID (282) may refer to a character string that uniquely identifies the given user with whom the backup mailbox (280) (as well as the corresponding mailbox on the mail server (see e.g., FIG. 1C)) may be associated. By way of an example, the mailbox ID (282) may take the form of an electronic mail address (e.g., user@example.com) assigned to the given user.

In one embodiment of the invention, each mailbox entry (284A-284N) may represent a logical container for storing an electronic mail message (as well as any child electronic mail related objects such as attachment(s)), either received or sent by the given user. Each mailbox entry (284A-284N), accordingly, may correspond to a similar mailbox entry (not shown) or electronic mail message retained for the given user of a mailbox on the mail server (see e.g., FIG. 1C). Further, though each similar mailbox entry of a mailbox on the mail server may store data and/or metadata representative of the electronic mail message and its child electronic mail related object(s) (if any) in entirety, each corresponding mailbox entry (284A-284N) of a backup mailbox (280) may instead just store a reference to the data representative of the electronic mail message (as well as a reference to the data representative of each child electronic mail related object (if any) of the electronic mail message).

In one embodiment of the invention, each above-mentioned reference, stored in a given mailbox entry (284A-284N), may take the form of an object ID (222A-222N) that uniquely identifies an object maintained in the object store on the backup storage system (see e.g., FIG. 1D). The object(s), identified by the object ID(s) (222A-222N), may each pertain to a given message content of a given message or a given attachment content of a given attachment (see e.g., FIG. 2B). Further, by storing only the reference(s) to an electronic mail message and its child electronic mail related object(s) in each mailbox entry (284A-284N) and across each backup mailbox (280), the backup storage system may eliminate content redundancy observed in similar electronic mail messages, as well as similar child electronic mail related objects, circulated about amongst different users. Moreover, through the elimination of redundant content, a more efficient use of the limited storage space of the backup storage system may be achieved, as well as the facilitation of faster successive backup and/or recovery operations.

While FIG. 2E shows a configuration of subcomponents, other backup mailbox (280) configurations may be used without departing from the scope of the invention.

Figure 3A:
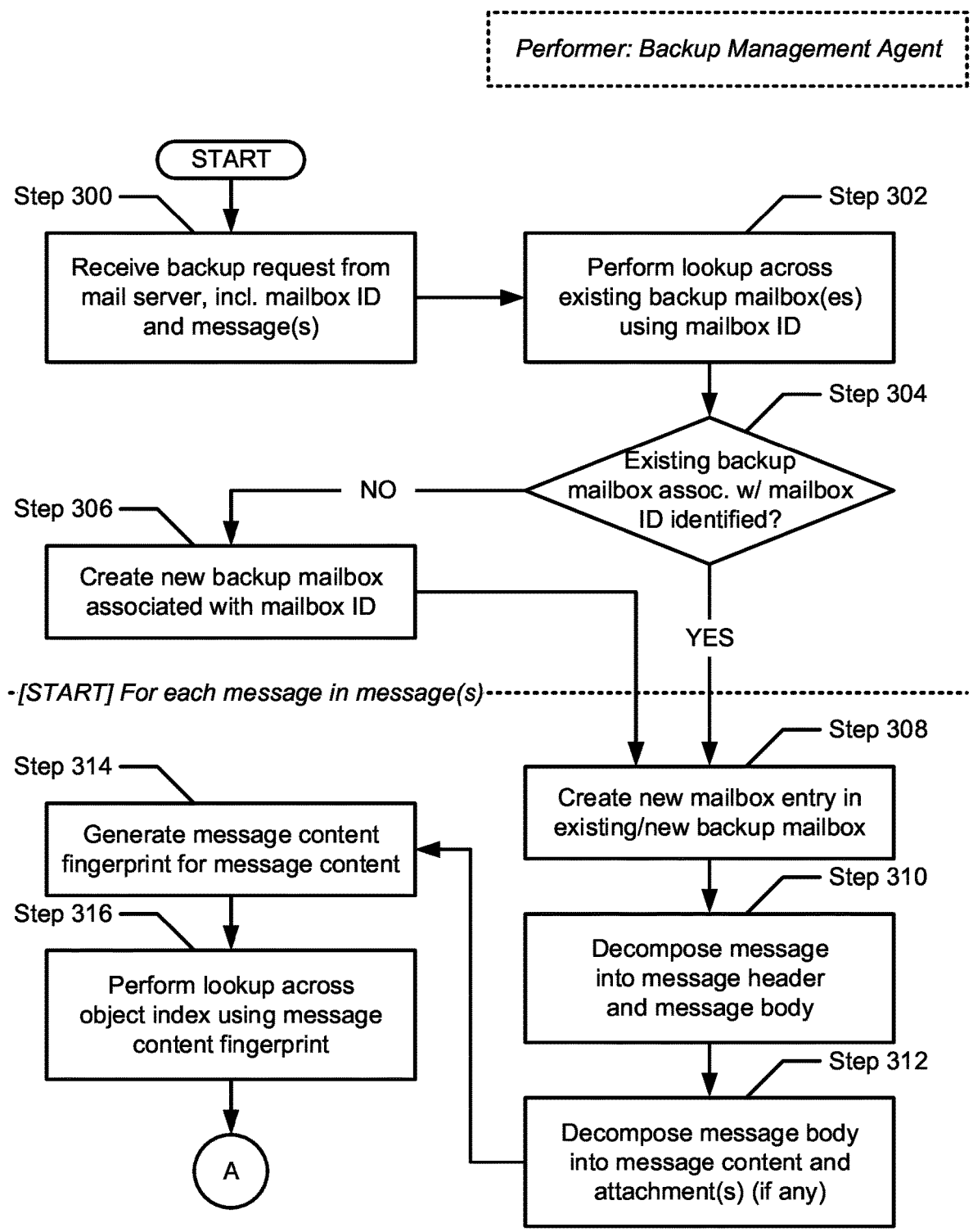
FIGS. 3A-3C show a flowchart describing a method for completing a backup request in accordance with one or more embodiments of the invention.
Figure 3B:
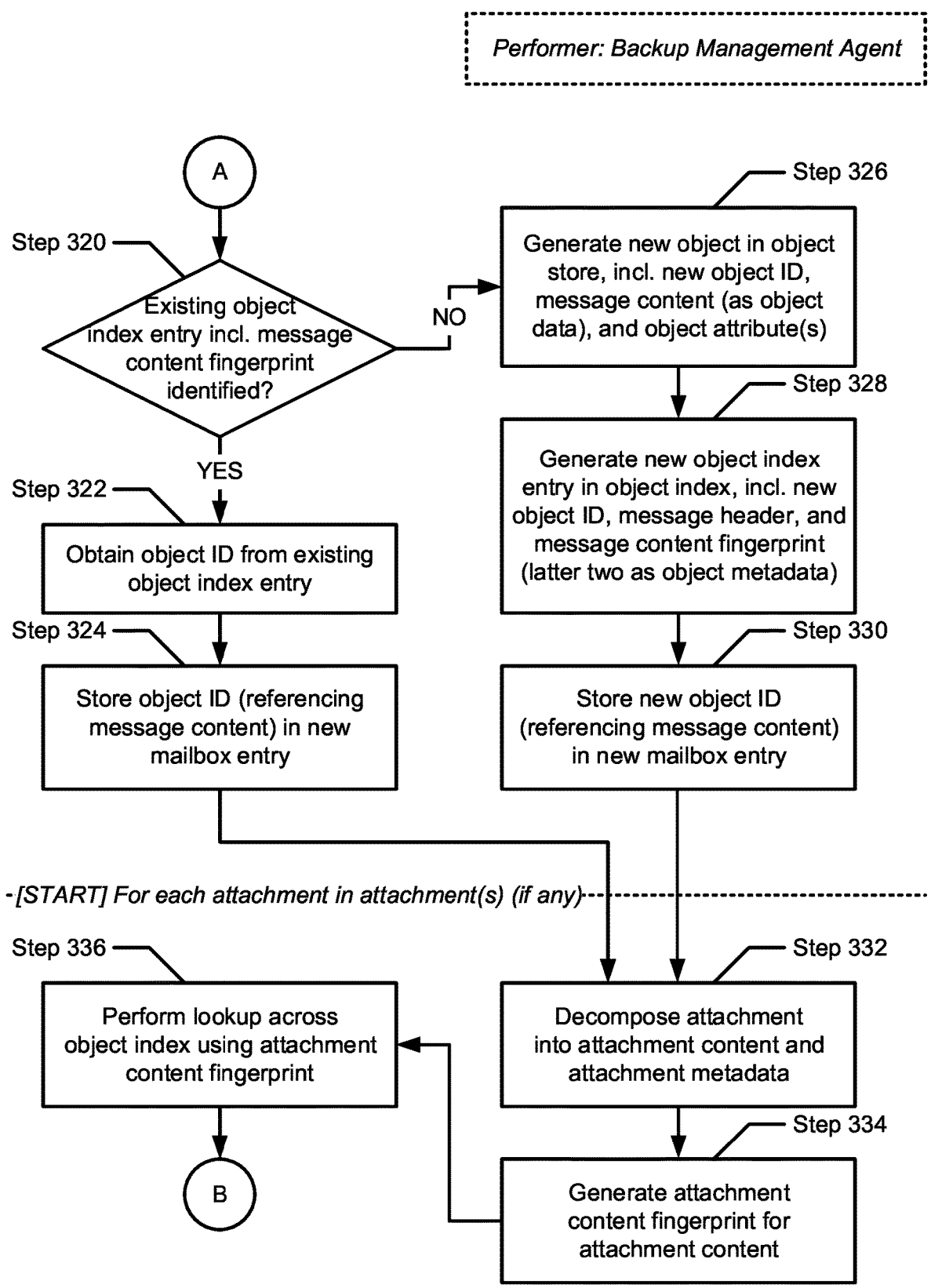
Figure 3C:
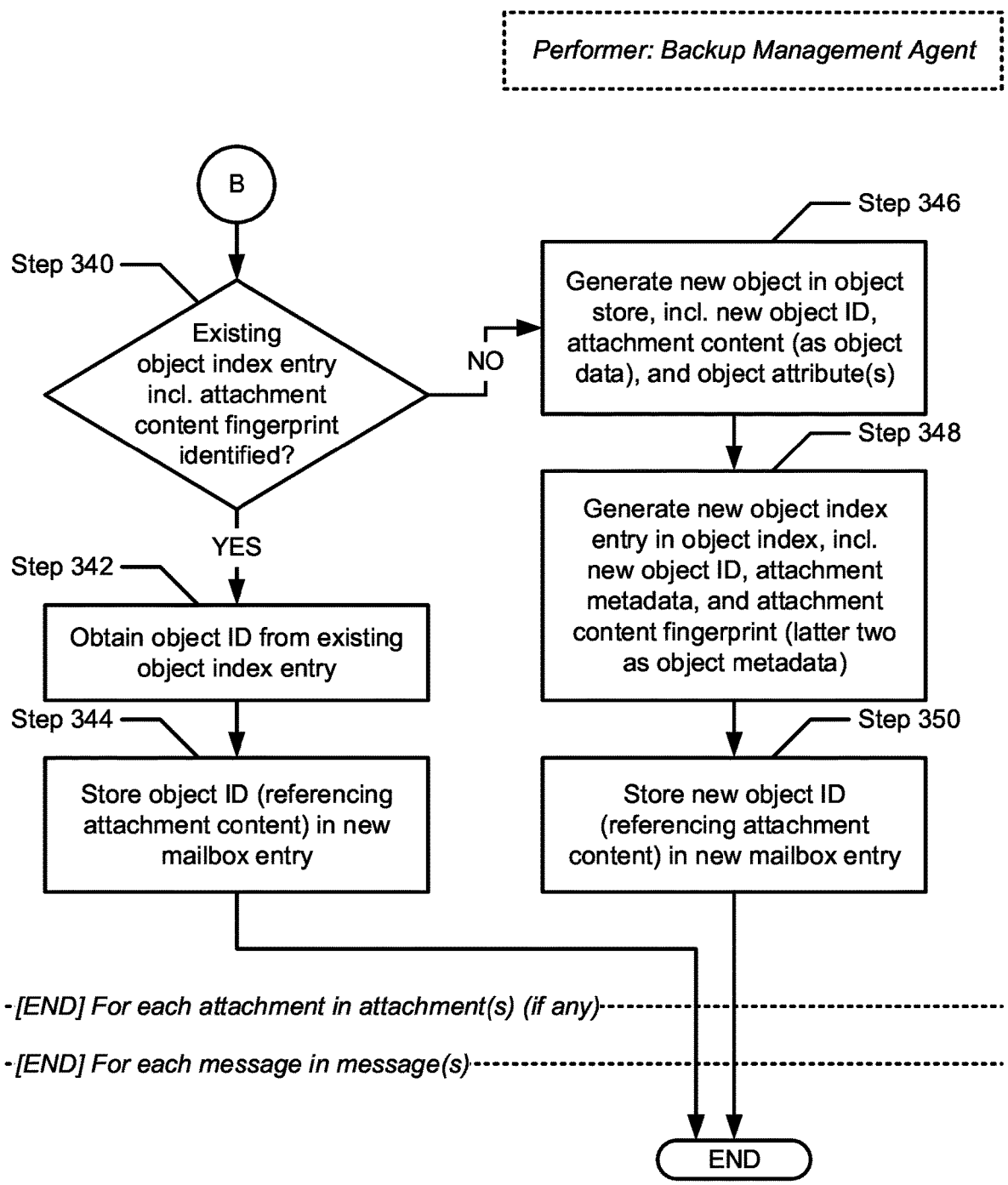

FIGS. 3A-3C show a flowchart describing a method for completing a backup request in accordance with one or more embodiments of the invention. The various steps outlined below may be performed by the backup management agent on the backup storage system (see e.g., FIG. 1D). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a backup request is received from the mail server (or more specifically, the data protection agent thereon) (see e.g., FIG. 1C). In one embodiment of the invention, the backup request may include a mailbox ID and one or more messages. The mailbox ID may not only uniquely identify a particular mailbox and backup mailbox residing on the mail server and backup storage system, respectively, but may also uniquely identify a user associated with both. The message(s), on the other hand, may refer to electronic mail message(s) (including any child electronic mail related objects such as attachment(s)) sought to be protected against a data loss event. Further, the message(s) may be part of a full backup, an incremental backup, or a differential backup of the mailbox contents.

In Step 302, a lookup is performed across the existing backup mailbox(es) on the backup storage system using the mailbox ID (received in Step 300). Specifically, in one embodiment of the invention, the received mailbox ID may be compared against a mailbox ID maintained in each existing backup mailbox (see e.g., FIG. 2E).

In Step 304, a determination is made as to whether the lookup (performed in Step 302) resulted in the identification of an existing backup mailbox. The determination may entail verifying that an existing backup mailbox includes a mailbox ID that matches the received mailbox ID. Accordingly, in one embodiment of the invention, if it is determined that one of the existing backup mailbox(es) has been identified, then the method proceeds to Step 308. On the other hand, in another embodiment of the invention, if it is alternatively determined that none of the existing backup mailbox(es) have been identified, then the method alternatively proceeds to Step 306.

In Step 306, following the determination (in Step 304) that none of the existing backup mailbox(es) on the backup storage system includes a mailbox ID that matches the mailbox ID (received in Step 300), a new backup mailbox is created. In one embodiment of the invention, the new backup mailbox may subsequently be associated with the received mailbox ID. The method, hereinafter, proceeds to Step 308 (described below).

Hereinafter, the remaining steps (i.e., Steps 308 through 350) of the outlined method may be traversed iteratively for each message of the message(s) (received in Step 300). That is, a first iteration of the remaining steps may be performed for a first message of the message(s); a second iteration of the remaining steps may be performed for a second message of the message(s); and so forth, up until and including a last iteration of the remaining steps being performed for a last message of the message(s). Furthermore, the message involved with a given iteration of the remaining steps may henceforth be referred to as the given message.

In Step 308, following the creation of a new backup mailbox (in Step 306) or following the alternative determination (in Step 304) that an existing backup mailbox on the backup storage system includes a mailbox ID that matches the mailbox ID (received in Step 300), a new mailbox entry (see e.g., FIG. 2E) is created. That is, in one embodiment of the invention, the new mailbox entry may be created and stored within the identified existing backup mailbox. In another embodiment of the invention, the new mailbox entry may be created and stored within the recently created new backup mailbox.

In Step 310, the given message (see e.g., FIG. 2A) is decomposed into a message header and a message body. Thereafter, in Step 312, the message body (obtained in Step 310) is further decomposed into message content and one or more attachments (if any had been enclosed).

In Step 314, a message content fingerprint is generated for the message content (obtained in Step 312). In one embodiment of the invention, the message content fingerprint may refer to a digital signature that may uniquely identify the message content. Further, the message content fingerprint may be generated by submitting the message content through a hash function, which may employ any combination of existing and/or future developed cryptographic algorithms.

In Step 316, a lookup is performed across the object index on the backup storage system (see e.g., FIG. 1D) using the message content fingerprint (generated in Step 314). Specifically, in one embodiment of the invention, the generated message content fingerprint may be compared against a message content fingerprint maintained in zero or more existing object index entries (see e.g., FIG. 2C).

Turning to FIG. 3B, in Step 320, a determination is made as to whether the lookup (performed in Step 316) resulted in the identification of an existing object index entry. The determination may entail verifying that an existing object index entry includes a message content fingerprint that matches the message content fingerprint (generated in Step 314). Accordingly, in one embodiment of the invention, if it is determined that one of the existing object index entries has been identified, then the method proceeds to Step 322. On the other hand, in another embodiment of the invention, if it is alternatively determined that none of the existing object index entries have been identified, then the method alternatively proceeds to Step 326.

In Step 322, following the determination (in Step 320) that an existing object index entry of the object index on the backup storage system includes a message content fingerprint that matches the message content fingerprint (generated in Step 314), an object identifier (ID), also specified in the identified existing object index entry, is obtained therefrom. In one embodiment of the invention, the object ID may uniquely identify an existing object (see e.g., FIG. 2B) stored in the object store of the backup storage system (see e.g., FIG. 1D). The existing object may retain the message content (obtained in Step 312).

In Step 324, the object ID (obtained in Step 322) is subsequently stored in the new mailbox entry (created in Step 308). Accordingly, in one embodiment of the invention, a reference to content of the given message may be maintained in the new mailbox entry of the existing backup mailbox (identified in Step 304) or of the new backup mailbox (created in Step 306). The method, hereinafter, proceeds to Step 332 (described below).

In Step 326, following the alternative determination (in Step 320) that none of the existing object index entries of the object index on the backup storage system includes a message content fingerprint that matches the message content fingerprint (generated in Step 314), a new object (see e.g., FIG. 2B) is generated. In one embodiment of the invention, the new object may be created to include a new object ID that may uniquely identify the new object, the message content (obtained in Step 312) as object data, and zero or more object attributes descriptive of the new object. Once generated, the new object may subsequently be stored in the object store on the backup storage system.

In Step 328, a new object index entry is then generated. In one embodiment of the invention, the new object index entry may be created to include the new object ID that may uniquely identify the new object (generated in Step 326), the message header of the given message (obtained in Step 310), and the message content fingerprint (generated in Step 314). The latter two items may be retained collectively as object metadata. Further, once generated, the new object index entry may subsequently be stored in the object index on the backup storage system.

In Step 330, the new object ID that may uniquely identify the new object (generated in Step 326) is stored in the new mailbox entry (created in Step 308). Accordingly, in one embodiment of the invention, a reference to content of the given message may be maintained in the new mailbox entry of the existing backup mailbox (identified in Step 304) or of the new backup mailbox (created in Step 306). The method, hereinafter, proceeds to Step 332 (described below).

Hereinafter, the remaining steps (i.e., Steps 332 through 350) of the outlined method may be traversed iteratively for each attachment of the attachment(s) (obtained in Step 312). That is, a first iteration of the remaining steps may be performed for a first attachment of the attachment(s); a second iteration of the remaining steps may be performed for a second attachment of the attachment(s); and so forth, up until and including a last iteration of the remaining steps being performed for a last attachment of the attachments(s). Furthermore, the attachment involved with a given iteration of the remaining steps may henceforth be referred to as the given attachment. Conversely, should the given message include zero attachments, the remaining steps may not be performed for the given message.

In Step 332, the given attachment (see e.g., FIG. 2A) is decomposed into attachment content and attachment metadata. Thereafter, in Step 334, an attachment content fingerprint is generated for the attachment content (obtained in Step 332). In one embodiment of the invention, the attachment content fingerprint may refer to a digital signature that may uniquely identify the attachment content. Further, the attachment content fingerprint may be generated by submitting the attachment content through a hash function, which may employ any combination of existing and/or future developed cryptographic algorithms.

In Step 336, a lookup is performed across the object index on the backup storage system (see e.g., FIG. 1D) using the attachment content fingerprint (generated in Step 334). Specifically, in one embodiment of the invention, the generated attachment content fingerprint may be compared against an attachment content fingerprint maintained in zero or more existing object index entries (see e.g., FIG. 2C).

Turning to FIG. 3C, in Step 340, a determination is made as to whether the lookup (performed in Step 336) resulted in the identification of an existing object index entry. The determination may entail verifying that an existing object index entry includes an attachment content fingerprint that matches the attachment content fingerprint (generated in Step 334). Accordingly, in one embodiment of the invention, if it is determined that one of the existing object index entries has been identified, then the method proceeds to Step 342. On the other hand, in another embodiment of the invention, if it is alternatively determined that none of the existing object index entries have been identified, then the method alternatively proceeds to Step 346.

In Step 342, following the determination (in Step 340) that an existing object index entry of the object index on the backup storage system includes an attachment content fingerprint that matches the attachment content fingerprint (generated in Step 334), an object identifier (ID), also specified in the identified existing object index entry, is obtained therefrom. In one embodiment of the invention, the object ID may uniquely identify an existing object (see e.g., FIG. 2B) stored in the object store of the backup storage system (see e.g., FIG. 1D). The existing object may retain the attachment content (obtained in Step 332).

In Step 344, the object ID (obtained in Step 342) is subsequently stored in the new mailbox entry (created in Step 308). Accordingly, in one embodiment of the invention, a reference to content of the given attachment may be maintained in the new mailbox entry of the existing backup mailbox (identified in Step 304) or of the new backup mailbox (created in Step 306).

In Step 346, following the alternative determination (in Step 340) that none of the existing object index entries of the object index on the backup storage system includes an attachment content fingerprint that matches the attachment content fingerprint (generated in Step 334), a new object (see e.g., FIG. 2B) is generated. In one embodiment of the invention, the new object may be created to include a new object ID that may uniquely identify the new object, the attachment content (obtained in Step 332) as object data, and zero or more object attributes descriptive of the new object. Once generated, the new object may subsequently be stored in the object store on the backup storage system.

In Step 348, a new object index entry is then generated. In one embodiment of the invention, the new object index entry may be created to include the new object ID that may uniquely identify the new object (generated in Step 346), the attachment metadata of the given attachment (obtained in Step 332), and the attachment content fingerprint (generated in Step 334). The latter two items may be retained collectively as object metadata. Further, once generated, the new object index entry may subsequently be stored in the object index on the backup storage system.

In Step 350, the new object ID that may uniquely identify the new object (generated in Step 346) is stored in the new mailbox entry (created in Step 308). Accordingly, in one embodiment of the invention, a reference to content of the given attachment may be maintained in the new mailbox entry of the existing backup mailbox (identified in Step 304) or of the new backup mailbox (created in Step 306).

Figure 4A:
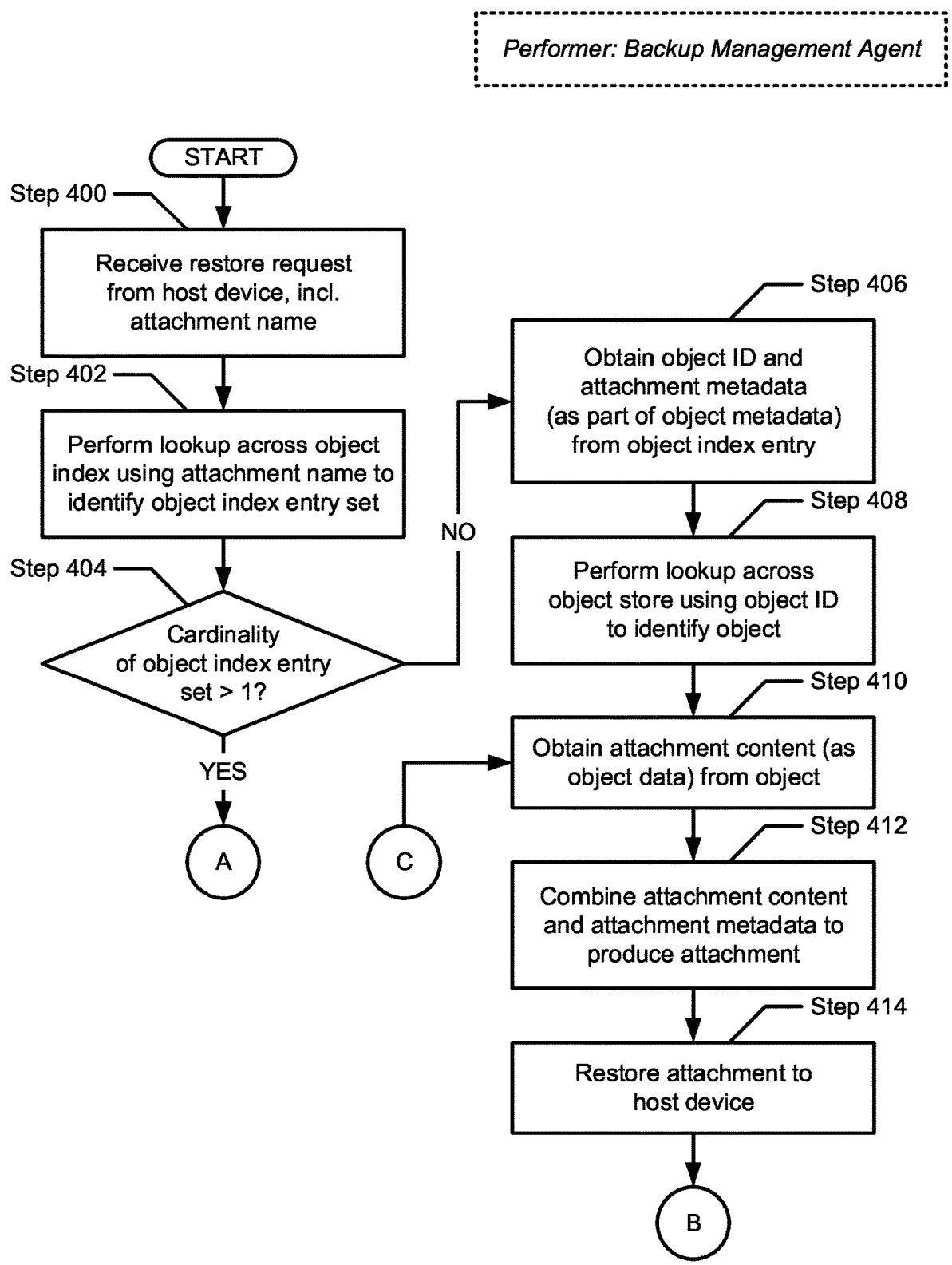
FIGS. 4A-4C show a flowchart describing a method for completing a restore request in accordance with one or more embodiments of the invention.
Figure 4B:
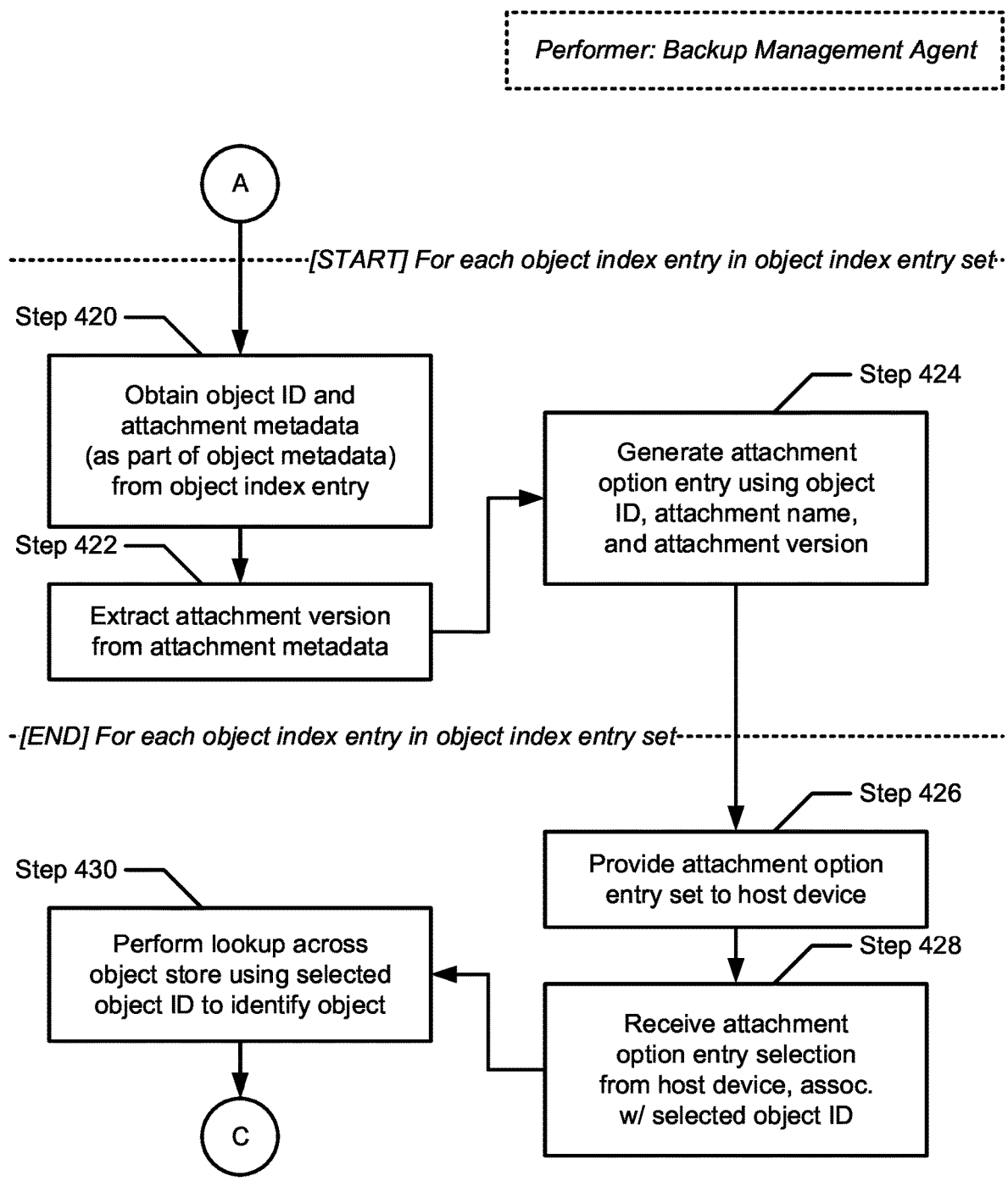
Figure 4C:
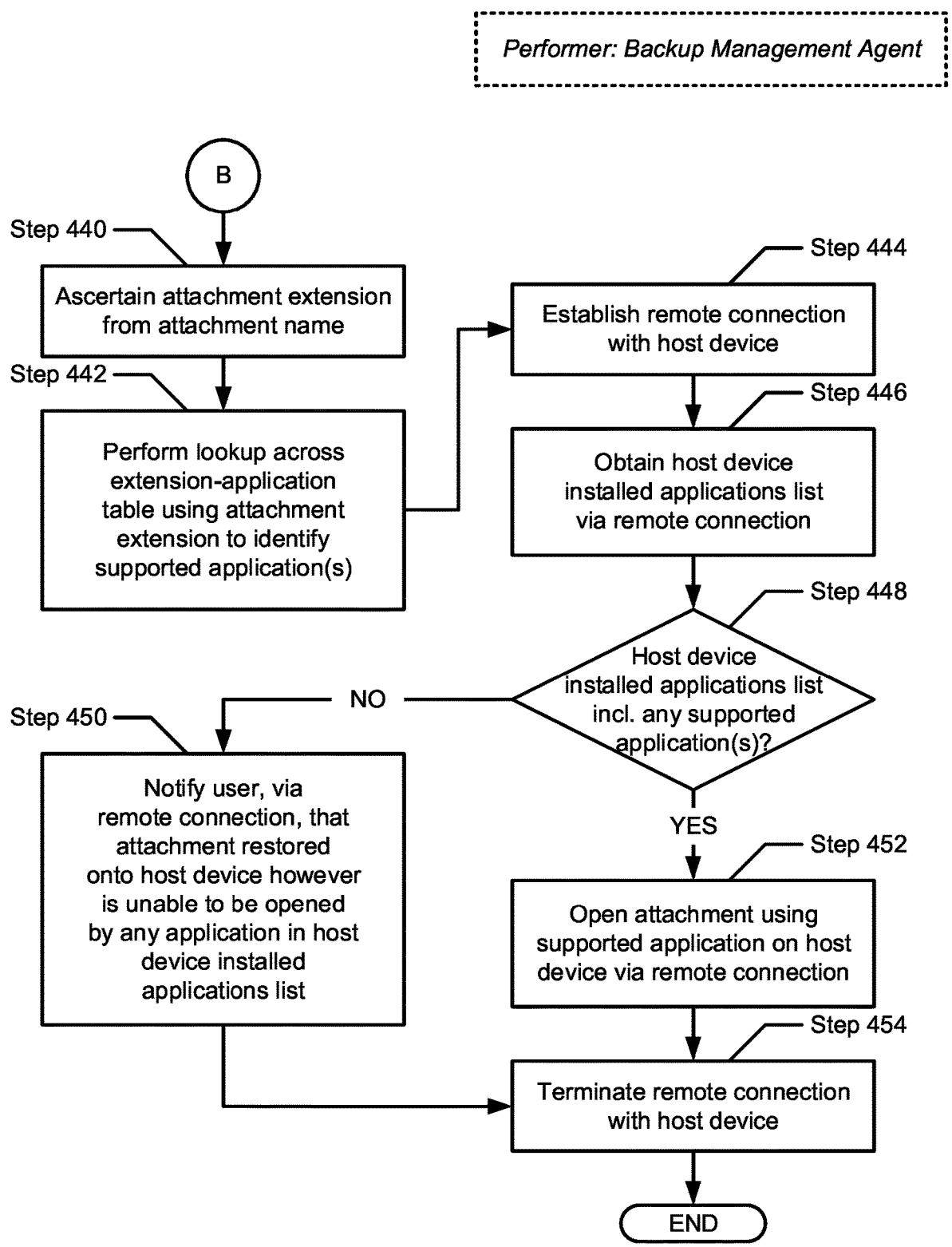

FIGS. 4A-4C show a flowchart describing a method for completing a restore request in accordance with one or more embodiments of the invention. The various steps outlined below may be performed by the backup management agent on the backup storage system (see e.g., FIG. 1D). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, a restore request is received from a host device (see e.g., FIG. 1A). In one embodiment of the invention, the restore request may include an attachment name. The attachment name may refer to a user given name for an attachment sought to be restored onto the host device.

In Step 402, a lookup is performed across the object index on the backup storage system (see e.g., FIG. 1D) using the attachment name (received in Step 400). Specifically, in one embodiment of the invention, the received attachment name may be compared against attachment metadata maintained in one or more object index entries (see e.g., FIG. 2C). The attachment metadata, in any given object index entry, may refer to a collection of supplemental information descriptive of a given attachment. Examples of the supplemental information forming the attachment metadata may include, but are not limited to: an attachment name (e.g., "statement.pdf") reflective of an attachment title (e.g. "statement") and an attachment extension (e.g., ".pdf") associated with the given attachment; an attachment author reflecting a name of a user that created the given attachment or a name of a computing system on which the given attachment may have been created; a modified time stamp encoding a date and/or time that the given attachment had been modified last; an attachment size (e.g., measured in bytes) reflective of the storage space that may be consumed by the given attachment; and an attachment version enumerating a given state of the given attachment at a given point-in-time along its changes history. Furthermore, through the aforementioned lookup, an object index entry set (including at least one object index entry), is identified.

In Step 404, a determination is made as to whether a cardinality of the object index entry set (identified in Step 402) exceeds one. Accordingly, in one embodiment of the invention, if it is determined that the object index entry set includes no more than one object index entry, then the method proceeds to Step 406. On the other hand, in another embodiment of the invention, if it is alternatively determined that the object index entry set includes more than one object index entry, then the method alternatively proceeds to Step 420 (see e.g., FIG. 4B).

In Step 406, following the determination (in Step 404) that the cardinality of the object index entry set (identified in Step 402) equals one, object metadata, stored in the identified object index entry, is obtained therefrom. In one embodiment of the invention, the object metadata (see e.g., FIG. 2C) may include attachment metadata descriptive of an attachment (stored on the backup storage system) and an attachment content fingerprint representative of a digital signature that may uniquely identify the attachment content portion of the attachment.

In Step 408, a lookup is performed across the object store on the backup storage system (see e.g., FIG. 1D) using the object ID (obtained in Step 406). Specifically, in one embodiment of the invention, the obtained object ID may be compared against an object ID maintained each of the objects stored in the object store (see e.g., FIG. 2B). Because an object ID is unique to each object, the aforementioned lookup may result in the identification of one of the stored objects.

In Step 410, following the lookup (performed in Step 408 or 430 (described below)), object data, stored in the object (identified in Step 408 or 430), is obtained therefrom. In one embodiment of the invention, the object data (see e.g., FIG. 2B) may include the attachment content portion of an attachment.

In Step 412, the attachment content (obtained in Step 410) and the attachment metadata (obtained in Step 406) are subsequently combined to produce the attachment. In Step 414, the attachment (produced in Step 412) is then restored onto the host device. The method, hereinafter, proceeds to Step 440 (described below).

Hereinafter, a subset of the remaining steps (i.e., Steps 420 through 424) of the outlined method may be traversed iteratively for each object index entry of the two or more object index entries forming the object index entry set (identified in Step 402). That is, a first iteration of the remaining steps subset may be performed for a first object index entry of the object index entry set; a second iteration of the remaining steps subset may be performed for a second object index entry of the object index entry set; and so forth, up until and including a last iteration of the remaining steps subset being performed for a last object index entry of the object index entry set. Furthermore, the object index entry involved with a given iteration of the remaining steps subset may henceforth be referred to as the given object index entry.

Turning to FIG. 4B, in Step 420, following the alternative determination (in Step 404) that the cardinality of the object index entry set (identified in Step 402) exceeds one, an object ID and attachment metadata (stored as a portion of the object metadata) are obtained from the given object index entry. In one embodiment of the invention, the object ID may uniquely identify an object maintained in the object store on the backup storage system. The attachment metadata, meanwhile, may refer to a collection of supplemental information descriptive of an attachment whose attachment content may be included in the aforementioned object. Examples of the supplemental information forming the attachment metadata may include, but are not limited to: an attachment name (e.g., "statement.pdf") reflective of an attachment title (e.g. "statement") and an attachment extension (e.g., ".pdf") associated with the given attachment; an attachment author reflecting a name of a user that created the given attachment or a name of a computing system on which the given attachment may have been created; a modified timestamp encoding a date and/or time that the given attachment had been modified last; an attachment size (e.g., measured in bytes) reflective of the storage space that may be consumed by the given attachment; and an attachment version enumerating a given state of the given attachment at a given point-in-time along its changes history.

In Step 422, an attachment version (described above) is extracted from the attachment metadata (obtained in Step 420). Thereafter, in Step 424, an attachment option entry is generated. In one embodiment of the invention, the attachment option entry may be generated to include the object ID (obtained in Step 420), the attachment name (received in Step 400), and the attachment version (extracted in Step 422). Because of the lookup (performed in Step 402), the received attachment name should match the attachment name embedded as part of the attachment metadata (obtained in Step 420).

In Step 426, following the iterations of the above-mentioned remaining steps subset, performed for each object index entry in the object index entry set (identified in Step 402), an attachment option entry set is obtained. In one embodiment of the invention, the attachment option entry set may include an attachment option entry (generated in Step 424) for each object index entry. Accordingly, a cardinality of the attachment option entry set matches a cardinality of the object index entry set. Further, the attachment option entry set may summarily list different versions of an attachment—all harboring the same attachment name yet individually different due to changes from versioning.

Moreover, in one embodiment of the invention, once obtained, the attachment option entry set may be presented (or otherwise provided) to the host device. Following the presentation of the attachment option entry set on the host device, a user thereof (whom may have submitted the restore request) may be prompted to select the version of the attachment they wish to see restored. The selected attachment version, corresponding to one of the attachment option entries forming the attachment option entry set, may hereinafter be referred to as the attachment option entry selection.

In Step 428, the above-mentioned attachment option entry selection is received from the host device. In one embodiment of the invention, the attachment option entry selection, representative of the selected attachment version, may be associated with an object ID (henceforth referred to as the selected object ID).

In Step 430, a lookup is performed across the object store on the backup storage system (see e.g., FIG. 1D) using the selected object ID (identified in Step 428). Specifically, in one embodiment of the invention, the selected object ID may be compared against an object ID maintained each of the objects stored in the object store (see e.g., FIG. 2B). Because an object ID is unique to each object, the aforementioned lookup may result in the identification of one of the stored objects. The method, from here, proceeds to Step 410 (described above) (see e.g., FIG. 4A).

Turning to FIG. 4C, in Step 440, following restoration onto the host device (in Step 414) of the attachment (produced in Step 412), an attachment extension is ascertained. Specifically, in one embodiment of the invention, the attachment name (e.g., "statement.pdf") (received in Step 400) may be decomposed into its constituent parts—i.e., an attachment title (e.g., "statement") and the attachment extension (e.g., "pdf"). The attachment extension may refer to an identifier that indicates a content type or format of attachment.

In Step 442, a lookup is performed across an extension-application table (see e.g., FIG. 2D) using the attachment extension (ascertained in Step 440). Specifically, in one embodiment of the invention, the ascertained attachment extension may be compared against an attachment extension maintained in each existing table entry of the extension-application table. Further, the aforementioned lookup may result in the identification of one of the table entries, where the identified table entry, aside from the ascertained attachment extension, may also specify one or more supported applications. Each supported application may refer to a software application or computer program known to be able to open or properly read and/or modify any file (e.g., attachment) associated with the attachment extension.

In Step 444, a remote connection, to/with the host device, is established. In one embodiment of the invention, establishment of the remote connection may employ any existing remote connection protocol.

In Step 446, via the remote connection (established in Step 444), a host device installed applications list is obtained. In one embodiment of the invention, the host device installed applications list may refer to a data structure that names each software application (or computer program) that may be currently installed on the host device.

In Step 448, a determination is made as to whether the host device installed applications list (obtained in Step 446) specifies any of the supported application(s) (identified in Step 442). The determination may entail comparing software application name(s) specified in the host device installed applications list against the name(s) of the supported application(s), in an attempt to identify at least one match. Accordingly, in one embodiment of the invention, if it is determined that none of the software application name(s), specified in the host device installed applications list, matches any name(s) of the supported application(s), then the method proceeds to Step 450. On the other hand, in another embodiment of the invention, if it is alternatively determined that at least one of the software application name(s), specified in the host device installed applications list, matches any name(s) of the supported application(s), then the method alternatively proceeds to Step 452.

In Step 450, following the determination (in Step 448) that none of the software application name(s), specified in the host device installed applications list (obtained in Step 446), matches any name(s) of the supported application(s) (identified in Step 442), a notification is presented to a user of the host device via the remote connection (established in Step 444). In one embodiment of the invention, the notification may inform the user that the sought/selected attachment, associated with the attachment name (received in Step 400), has been restored onto the host device. The notification may further indicate a file system directory on the host device where the attachment (restored in Step 414) may be found. Moreover, the notification may also inform the user that none of the software application(s), currently installed on the host device, may be able to properly open/read the restored attachment. Further, the notification may provide the user software application suggestion(s), based on the identified supported application(s), which may enable the user to open/read the attachment (following attainment of the suggestion(s) by the user). The method, from here, proceeds to Step 454 (described below).

In Step 452, following the alternative determination (in Step 448) that at least one of the software application names, specified in the host device installed applications list (obtained in Step 446), matches any name(s) of the supported application(s) (identified in Step 442), a software application name, of the aforementioned at least one software application name, is selected. Thereafter, in one embodiment of the invention, the attachment (restored in Step 414) may be opened on the host device, via the remote connection (established in Step 444), using the installed software application corresponding to the selected software application name.

In Step 454, the remote connection (established in Step 444) is terminated.

Figure 5:
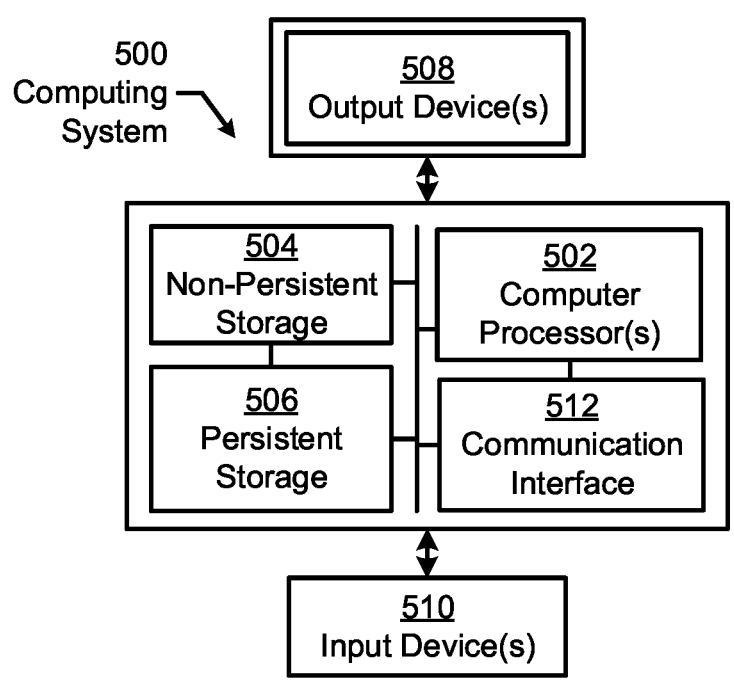
FIG. 5 shows an exemplary computing system in accordance with one or more embodiments of the invention.

FIG. 5 shows an exemplary computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (304), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for protecting electronic mail objects, the method comprising:
   receiving a backup request comprising an electronic mail message;
   decomposing the electronic mail message into a message header and a message body, wherein the message body comprises a message content;
   generating a message content fingerprint based on the message content;
   making a determination that an object index excludes an existing object index entry comprising the message content fingerprint;
   based on the determination:
      storing, in an object store, a new object comprising a new object identifier (ID) and the message content;
      storing, in the object index, a new object index entry comprising the new object ID, the message header, and the message content fingerprint; and
      storing, to fulfill the backup request, the new object ID in a backup mailbox.

2. The method of claim 1, wherein the electronic mail message comprises an attachment.

3. The method of claim 2, the method further comprising:
   decomposing the attachment into an attachment content and attachment metadata;
   generating an attachment content fingerprint based on the attachment content;
   making a second determination that the object index excludes a second existing object index entry comprising the attachment content fingerprint;
   based on the second determination:
      storing, in the object store, a second new object comprising a second new object ID and the attachment content;
      storing, in the object index, a second new object index entry comprising the second new object ID, the attachment metadata, and the attachment content fingerprint; and
      storing, to further fulfill the backup request, the second new object ID in the backup mailbox.

4. The method of claim 3, the method further comprising:
   receiving a restore request comprising an attachment name;
   identifying, in the object index, the second new object index entry, wherein the attachment metadata therein comprises the attachment name;
   identifying, in the object store, the second new object using the second new object ID specified in the second new object index entry;
   combining, to produce the attachment, the attachment content specified in the second new object and the attachment metadata specified in the second new object index entry; and
   restoring, to fulfill the restore request, the attachment onto a host device.

5. The method of claim 4, the method further comprising:
   extracting an attachment extension from the attachment name;
   identifying, in an extension-application table, a table entry comprising the attachment extension and a supported application name;
   establishing a remote connection to the host device;
   through the remote connection:
      obtaining, from the host device, a host device installed applications list comprising the supported application name; and
      opening, on the host device, the attachment using a software application installed on the host device that is associated with the supported application name.

6. The method of claim 3, the method further comprising:
   receiving a restore request comprising an attachment name;
   identifying, in the object index, a first existing object index entry comprising second attachment metadata, and a second existing object index entry comprising third attachment metadata,
      wherein the second attachment metadata and the third attachment metadata each comprises the attachment name,
      wherein the second attachment metadata further comprises a first attachment version and the third attachment metadata further comprises a second attachment version;
   prompting a user to select one from a group consisting of the first attachment version and the second attachment version;
   receiving, from the user, a selection comprising an attachment version selected from the group; and
   restoring, based on the selection and to fulfill the restore request, a second attachment reflective of the attachment version onto a host device.

7. The method of claim 2, the method further comprising:
   decomposing the attachment into an attachment content and attachment metadata;
   generating an attachment content fingerprint based on the attachment content;
   identifying, in the object index, a second existing object index entry comprising the attachment content fingerprint and an existing object ID; and
   storing, to further fulfill the backup request, the existing object ID in the backup mailbox.

8. The method of claim 1, the method further comprising:
   receiving a second backup request comprising a second electronic mail message;
   decomposing the second electronic mail message into a second message header and a second message body, wherein the second message body comprises a second message content;
   generating a second message content fingerprint based on the second message content;
   identifying, in the object index, a second existing object index entry comprising the second message content fingerprint and an existing object ID; and
   storing, to fulfill the second backup request, the existing object ID in the backup mailbox.

9. A non-transitory computer readable medium (CRM) comprising computer readable program code, which when executed by a computer processor, enables the computer processor to perform a method for protecting electronic mail objects, the method comprising:
   receiving a backup request comprising an electronic mail message;

decomposing the electronic mail message into a message header and a message body, wherein the message body comprises a message content;
generating a message content fingerprint based on the message content;
making a determination that an object index excludes an existing object index entry comprising the message content fingerprint;
based on the determination:
  storing, in an object store, a new object comprising a new object identifier (ID) and the message content;
  storing, in the object index, a new object index entry comprising the new object ID, the message header, and the message content fingerprint; and
  storing, to fulfill the backup request, the new object ID in a backup mailbox.

10. The non-transitory CRM of claim 9, wherein the electronic mail message comprises an attachment.

11. The non-transitory CRM of claim 10, the method further comprising:
decomposing the attachment into an attachment content and attachment metadata;
generating an attachment content fingerprint based on the attachment content;
making a second determination that the object index excludes a second existing object index entry comprising the attachment content fingerprint;
based on the second determination:
  storing, in the object store, a second new object comprising a second new object ID and the attachment content;
  storing, in the object index, a second new object index entry comprising the second new object ID, the attachment metadata, and the attachment content fingerprint; and
  storing, to further fulfill the backup request, the second new object ID in the backup mailbox.

12. The non-transitory CRM of claim 11, the method further comprising:
receiving a restore request comprising an attachment name;
identifying, in the object index, the second new object index entry, wherein the attachment metadata therein comprises the attachment name;
identifying, in the object store, the second new object using the second new object ID specified in the second new object index entry;
combining, to produce the attachment, the attachment content specified in the second new object and the attachment metadata specified in the second new object index entry; and
restoring, to fulfill the restore request, the attachment onto a host device.

13. The non-transitory CRM of claim 12, the method further comprising:
extracting an attachment extension from the attachment name;
identifying, in an extension-application table, a table entry comprising the attachment extension and a supported application name;
establishing a remote connection to the host device;
through the remote connection:
  obtaining, from the host device, a host device installed applications list comprising the supported application name; and
  opening, on the host device, the attachment using a software application installed on the host device that is associated with the supported application name.

14. The non-transitory CRM of claim 11, the method further comprising:
receiving a restore request comprising an attachment name;
identifying, in the object index, a first existing object index entry comprising second attachment metadata, and a second existing object index entry comprising third attachment metadata,
  wherein the second attachment metadata and the third attachment metadata each comprises the attachment name,
  wherein the second attachment metadata further comprises a first attachment version and the third attachment metadata further comprises a second attachment version;
prompting a user to select one from a group consisting of the first attachment version and the second attachment version;
receiving, from the user, a selection comprising an attachment version selected from the group; and
restoring, based on the selection and to fulfill the restore request, a second attachment reflective of the attachment version onto a host device.

15. The non-transitory CRM of claim 10, the method further comprising:
decomposing the attachment into an attachment content and attachment metadata;
generating an attachment content fingerprint based on the attachment content;
identifying, in the object index, a second existing object index entry comprising the attachment content fingerprint and an existing object ID; and
storing, to further fulfill the backup request, the existing object ID in the backup mailbox.

16. The non-transitory CRM of claim 9, the method further comprising:
receiving a second backup request comprising a second electronic mail message;
decomposing the second electronic mail message into a second message header and a second message body, wherein the second message body comprises a second message content;
generating a second message content fingerprint based on the second message content;
identifying, in the object index, a second existing object index entry comprising the second message content fingerprint and an existing object ID; and
storing, to fulfill the second backup request, the existing object ID in the backup mailbox.

17. A system, the system comprising:
computer storage implementing an object index, and object store, and a plurality of backup mailboxes;
a computer processor operatively connected to the computer storage; and
a backup management agent executing on the computer processor, and configured to perform a method for protecting electronic mail objects, the method comprising:
  receiving a backup request comprising an electronic mail message;
  decomposing the electronic mail message into a message header and a message body, wherein the message body comprises a message content;

generating a message content fingerprint based on the message content;

making a determination that the object index excludes an existing object index entry comprising the message content fingerprint;

based on the determination:

storing, in the object store, a new object comprising a new object identifier (ID) and the message content;

storing, in the object index, a new object index entry comprising the new object ID, the message header, and the message content fingerprint; and storing, to fulfill the backup request, the new object ID in a backup mailbox of the plurality of backup mailboxes.

18. The system of claim 17, the system further comprising a backup storage system comprising the computer storage and the computer processor.

19. The system of claim 18, the system further comprising a mail server operatively connected to the backup storage system, wherein the backup request is submitted by the mail server.

20. The system of claim 19, wherein the mail server comprises second computer storage implementing a plurality of mailboxes that correspond to the plurality of backup mailboxes on the backup storage system.

\* \* \* \* \*